May 23, 1967

C. O. MOORHEAD 3,321,085

WATER CONDITIONER

Filed June 10, 1965

Charles O. Moorhead
INVENTOR.

BY Murray Robinson
ATTORNEY

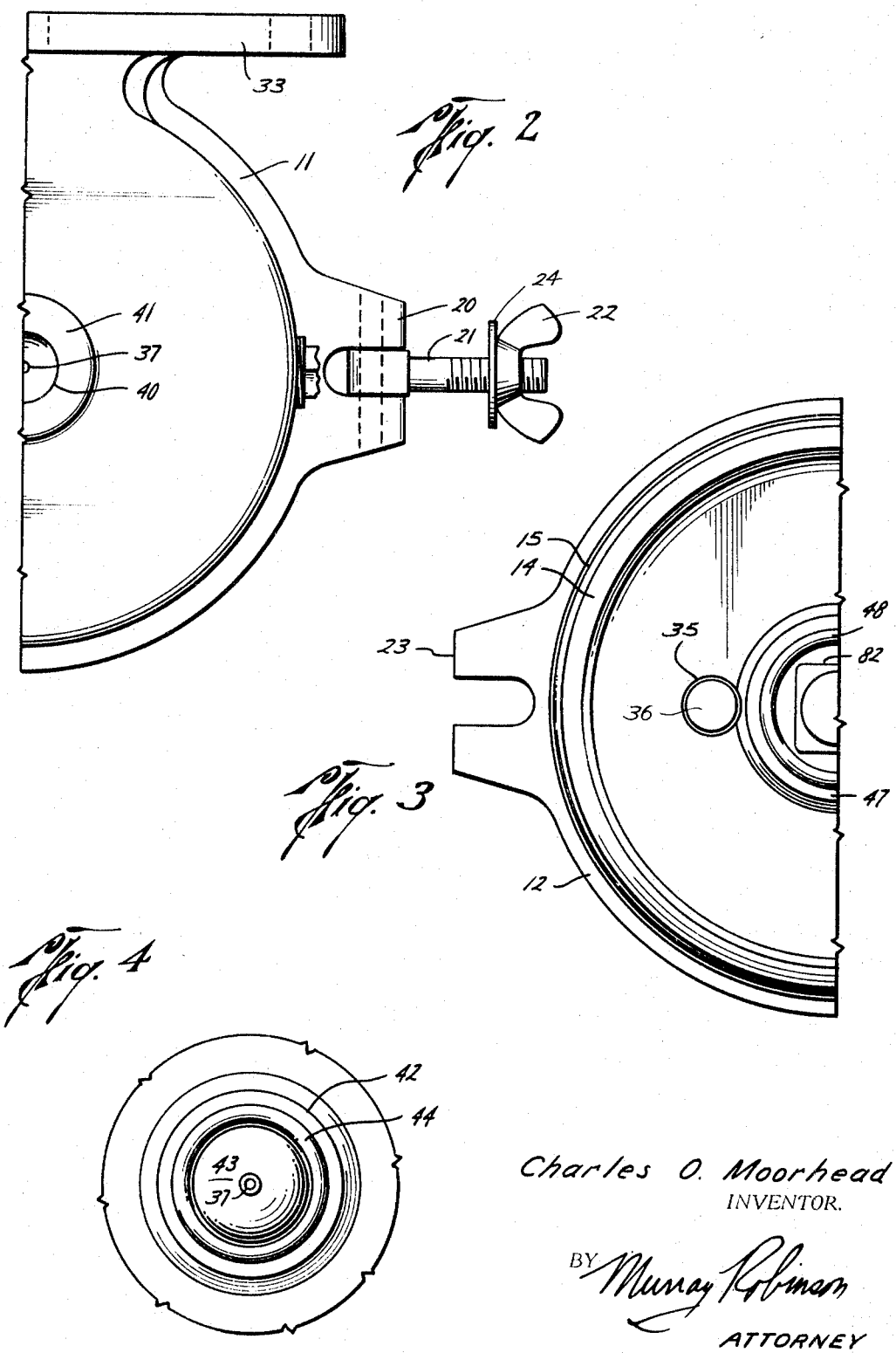

United States Patent Office 3,321,085
Patented May 23, 1967

3,321,085
WATER CONDITIONER
Charles O. Moorhead, Oklahoma City, Okla., assignor to M-C-M Machine Works, Oklahoma City, Okla., a partnership
Filed June 10, 1965, Ser. No. 462,986
1 Claim. (Cl. 210—232)

This invention pertains to apparatus for softening water, filtering water, and treating water to reduce electrotypes, corrosion, and oxidation.

Heretofore a water softening and filtering unit has been provided including a housing comprising a cylindrical cup having a removable top. Concentrically within the cup was mounted a perforated tube. A tubular filter-softener cartridge was slipped over the perforated tube inside the cup. Water entered the cup through an aperture in the side and after passing through the cartridge and entering the perforated tube the water left through an outlet in the bottom of the cup. When the cartridge was spent the top of the housing was removed and the cartridge removed and replaced.

Some difficulties were experienced with the aforementioned unit in that the mataerial filtered out of the water collects in the annulus between cup and cartridge. Initially, the filter cake cements the cartridge to the cup making removal of the cartridge difficult, often requiring that the cartridge be beaten out of the cup with a bar. This procedure is not only time consuming but often destroys the central perforated tube. In any case, after removal of the cartridge, filtered out particles remain in the cup. Since the cup is bolted to the frame of the internal combustion engine whose cooling water system is being purified, it is difficult to clean the cup.

The present invention overcomes the aforementioned difficulties with the above described unit by a combination of a number of added elements and features of construction as follows:

(1) The housing is made partable midway of its height and the inlet and outlet and the mounting bracket are provided on the upper part of the housing.

When it is desired to replace the cartridge the lower part of the housing can be removed. If the filter cake has bridged over between cartridge and housing, usually the bridge will extend only to the lower part of the housing. Therefore, the cartridge will stay with the lower part of the housing and these parts can be taken over to a workbench where the cartridge can be removed and the lower part of the housing cleaned and dumped.

(2) The perforated inner tube is made part of the removable replaceable cartridge.

When the cartridge is removed from the lower part of the housing there is no difficulty due to the cartridge having to be freed from the perforated tube. Should the cartridge stick in the upper part of the housing it will extend down therebelow so that it can be easily grasped and rocked free.

(3) A sacrificial metal bar, preferably magnesium is removably mounted in the lower part of the housing concentrically inside of the cartridge.

The resultant reduction of electrochemical pitting reduces the quantity of iron compounds entering the cooling water with the result that the amount of filter cake accumulating in the housing during the life of the softening agent in the cartridge is reduced. The bar also serves as a centering device for the cartridge so that when a new cartridge is positioned in the lower part of the housing it automatically engages with the seat around the water outlet in the top part of the housing when the parts of the housing are reassembled.

(4) A rust inhibitor in powder form is mixed with the water softener material and inserted along with the latter between the perforated tube and the filter sleeve of the cartridge.

Rust forming on the interior surfaces of the cooling passages of the engine breaks loose from the base metal as the latter expands and contracts and can form a large portion of the filter cake. By reduction of the amount of filter cake accumulating during the life of the softening agent of the cartridge, there is less likelihood of difficulty being experienced in removing the spent cartridge.

In carrying out the foregoing changes a number of important constructional features are employed among which may be mentioned the following:

(a) The cartridge is provided with soft resilient gaskets at both ends of the perforated tube to seal with annular hard seats formed in the upper and lower parts of the housing. Each time the cartridge is renewed, the gaskets are thus automatically renewed, so that reliance can be placed on gasket resiliency to provide the pressure needed to form a seal.

(b) A conical guide is provided in the upper part of the housing around the water outlet to guide the perforated tube of the cartridge onto its seat. The opening at the apex of the conical guide serves as a choke to limit the rate of flow of water through the unit to the most effective rate for the softening agent employed. This enables the tube perforations to be large and less likely to become clogged.

(c) A conical seat with an O-ring seal is provided between the upper and lower parts of the housing to permit assembly of the two parts of the housing without relative rotation thereof, so as not to damage the seals at the ends of the perforated tube.

(d) Pivoted studs are provided on the upper part of the housing engageable with the lower part of the housing through slots whereby the nuts need not be removed for disassembly nor replaced after assembly. This not only facilitates removal of the lower part of the housing but makes it less likely that the components of the conditioning unit be mismated during reassembly after the cartridge has been replaced.

Other features and advantages of the invention will become apparent from the following detailed description of a preferred embodiment thereof, reference being had to the accompanying drawings wherein:

FIGURE 2 is a fragmentary top view of the top part of the unit;

FIGURE 3 is a fragmentary top view of the lower part of the unit; and

FIGURE 4 is a fragmentary bottom view of the top part of the unit.

Figure 1:
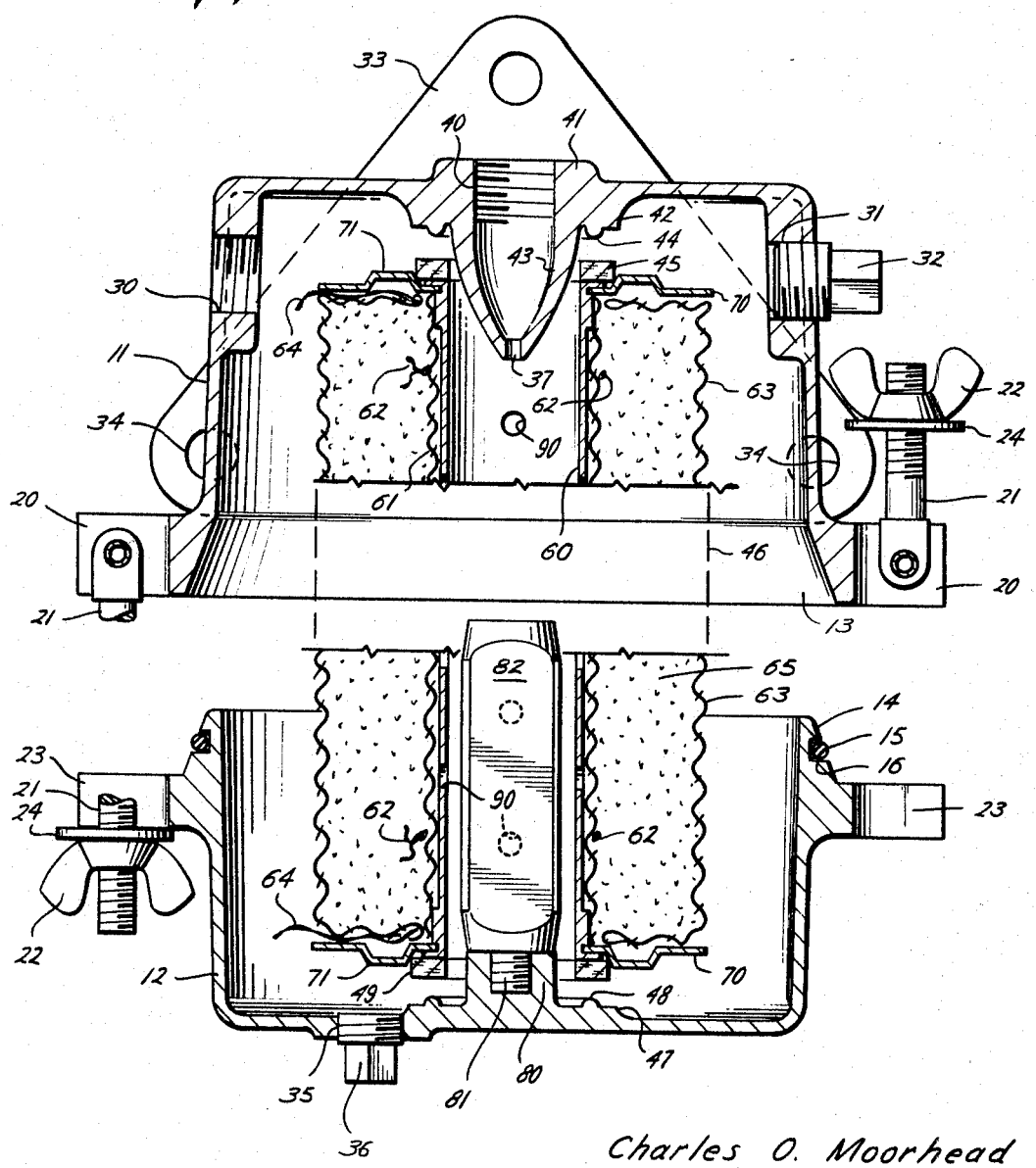
FIGURE 1 is a partially exploded vertical section through the water softening unit embodying the invention.

Referring now to FIGURE 1 there is shown a unit including a generally cylindrical aluminum housing having an upper cup shaped part 11 and a lower cup shaped part 12. The rim of the upper part 11 has a downwardly flaring conical face 13 adapted to engage a correlative downwardly flaring conical seat 14 on the rim of the lower part 12. An O-ring 15 disposed in and protruding from a groove 16 in seat 14 is adapted to seal with face 13 when the parts 12 and 17 are pressed together.

Referring now also to FIGURES 2 and 3, at diametrically opposite sides of housing part 11 there are pairs of bosses 20 between which are pivotally mounted studs 21 carrying wing nuts 22. The studs are adapted to pivot into position between pairs of bosses 23 on opposite sides of lower housing part 12, as best shown at the left hand side of FIGURE 1 or to be pivoted out of the way as shown at the right of FIGURE 1. Washers 24 are provided on each stud to cooperate with the undersides of bosses 23 when the studs are engaged therewith.

The upper housing part 11 is provided with a threaded water inlet port 30 and an alternative water inlet port 31 which is normally closed by screw plug 32. At the rear of part 11 is formed a triangular mounting bracket 33 having bolt holes 34 at the apices thereof. The lower housing part 17 has a drain port 35 normally closed by a screw plug 36, whereby the unit can be readily drained of water when freezing temperatures are expected, without the need for separation of the housing parts 11 and 12.

Referring now also to FIGURE 4 in the center of the top of housing part 11 is a threaded water outlet passage 40 passing through exterior boss 41 and interior boss 42. An upwardly flaring conical tube 43 extending inwardly from boss 42 provides a restriction or a choke 37 to restrict the flow of water through the unit. In addition, the exterior of tube 43 serves as a centering means and guide for the cartridge. Around tube 43 and slightly spaced therefrom is an annular seat 44 to seal with the gasket 45 at the upper end of cartridge 46. In the center of the lower housing part 12 is a boss 47 carrying a similar annular seat 48 adapted to seal with gasket 49 on cartridge 46.

The cartridge 46 includes a central perforated aluminum tube 60 over the exterior of which is wrapped a filter cloth 61 such as muslin, tied in place with strings 62. A filter cloth tube 63 having draw cords 64 at each end thereof is secured around the tube 60 in spaced relation to cloth 61 except at the ends where the tube 63 is drawn tight around cloth 61 and tube 60.

In the space between cloth 61 and tube 63 is disposed a granular mixture 65 of a water softening agent and a rust inhibiting material. For example, the water softening agent may be one of the synthetic organic resins referred to on pages 9–47 in sec. 4 of Marks Mechanical Engineers Handbook, sixth ed. Preferably a cation exchange resin of the bead form polystyrene type known as Duolite C–20 made by Chemical Process Company, Redwood City, Calif., is used. This material will withdraw calcium and magnesium ions from the water and substitute sodium ions therefor. Alternatively a zeolite cation exchange mineral may be used, or other water softening material. The rust inhibitor may, for example, be any of the types referred to on pages 6–137 of Marks Handbook, e.g. of the type forming a protective film on the metal to be protected.

At each end of the perforated tube 60 is a zinc flange 70. The tube 60 has shoulders formed at each end against which rest flanges 70 and the ends of tube 60 are crimped over the flanges. Together, the tube 60 and flanges 70 form a spool around which the filter-softener materials are disposed. Each flange 70 is formed with an annular bead 71 which provides a socket to receive the respective one of the resilient cork gaskets 45, 49, the latter being cemented in place.

Centrally disposed in the bottom of lower housing part 12 is a pedestal 80 into a socket in which is screwed a stud 81. A magnesium sacrificial bar 82 has a threaded socket in its bottom by which it is screwed onto stud 81. When the unit is assembled the top end of stud 82 is several inches from the lower end of conical tube 43 forming the choke in the water inlet passage.

In use of the unit, the upper and lower housing parts 11 and 12 are fastened together with a fresh cartridge 46 therein and a new bar 82 in place. Water enters through inlet passage 30 at a rate controlled by outlet choke 37. The water passes through filter tube 63 which removes solid materials. In passing through the granular mixture 65 inside tube 63 the water is softened and picks up the rust inhibitor. The water then passes through filter cloth 61 which prevents the granular mixture 65 from being carried out of the unit. The water goes through holes 90 in perforated tube 60, the latter serving as a support for filter cloth 61. In passing over sacrificial bar 82 inside tube 60 the water is placed in contact with a metal that is anionic relative to the iron of the engine cooling system so that any galvanic current flow is away from the bar to the engine metal preventing the latter from being pitted by electric current flow therefrom.

When the granular mixture 65 is spent, the wing nuts 22 can be loosened, the studs 21 pivoted out of the way, the lower housing part 12 removed along with the cartridge 46, and the latter can be replaced. If need be the sacrificial bar 82 can also be replaced. The unit is then reassembled, the bar 82 serving to center the cartridge in the lower housing part 12 and the tube 43 serving as a center and guide for the cartridge as it is pushed up into the upper housing part 11.

While a preferred embodiment of the invention has been shown and described, modifications thereof can be made by one skilled in the art without departing from the spirit of the invention.

That being claimed is:

A water conditioning unit comprising a housing including a lower cup and an upper inverted cup, said upper cup including an inlet opening in the side thereof and an outlet opening in the center thereof and including also a means for mounting the unit in its intended place of use, means for releasably connecting said cups with their rims in sealing engagement, said means for connecting the cups including a conical face on the rim of the upper cup, a conical seal on the rim of the lower cup correlative to said conical face and having the lower cup correlative to said conical face and having a groove therein, an O-ring in said groove, and quickly attachable and detachable stud means for holding said cups together and putting pressure on said O-ring, a tubular filter-softener cartridge concentrically disposed in said housing, said cartridge including a perforated tube having flanges secured to its ends forming a spool, a filter cloth wrapped on said tube, a filter tube secured at its ends to said tube around said cloth, and a granular mixture of water softening agent and rust inhibitor in the space between said filter cloth and filter tube, a conical upwardly flaring tubular member extending down from the center of the upper cup around the outlet passage into the tubular cartridge, the apex of said conical member forming a flow restriction providing a choke, the exterior of said tubular member providing a means to position the tubular cartridge concentrically with respect to the outlet passage and also a means to guide the cartridge into centered position, and a sacrificial metal bar replaceably mounted in the lower cup extending concentrically inside the cartridge.

References Cited by the Examiner

UNITED STATES PATENTS

| | | | |
|---|---|---|---|
| 1,433,714 | 10/1922 | Giessel | 210—454 X |
| 2,097,828 | 11/1937 | Baldwin | 210—437 X |
| 2,316,206 | 4/1943 | Wilson | 210—453 X |
| 2,550,070 | 4/1951 | LaBrecque et al. | 210—484 X |
| 2,796,989 | 6/1957 | Kovacs | 210—493 X |
| 2,983,384 | 5/1961 | Winslow | 210—304 X |
| 3,002,870 | 10/1961 | Belgarde et al. | 210—446 X |
| 3,122,501 | 2/1964 | Hultgren | 210—444 X |
| 3,225,932 | 12/1965 | Dunn et al. | 210—484 X |

FOREIGN PATENTS

| | | |
|---|---|---|
| 553,819 | 3/1958 | Canada. |

OTHER REFERENCES

Popular Science Monthly, volume 174, No. 6, June 1959, page 205.

SAMIH N. ZAHARNA, *Primary Examiner.*